UNITED STATES PATENT OFFICE.

CARL O. JOHNS, OF NEW HAVEN, CONNECTICUT, AND ABRAHAM J. FINKS, OF PORTLAND, MAINE.

TYPE OF BREAD.

1,356,988.          Specification of Letters Patent.     Patented Oct. 26, 1920.

No Drawing.     Application filed September 4, 1920. Serial No. 408,366.

(FILED UNDER THE ACT OF MARCH 3, 1883, 22 STAT. L., 625.)

*To all whom it may concern:*

Be it known that we, CARL O. JOHNS and ABRAHAM J. FINKS, citizens of the United States of America, employees of the Department of Agriculture of the said United States, residing, respectively, in the city of New Haven, county of New Haven, State of Connecticut, and in the city of Portland, county of Cumberland, State of Maine, (whose post-office address is Department of Agriculture, Washington, D. C.,) have jointly invented certain new and Improved Type of Bread, of which the following is a full, clear, and exact description thereof.

This application is made under the act of March 3, 1883, Chapter 143 (22 Stat. 625), and the invention herein described and claimed may be used by the Government of the United States or any of its officers or employees in the prosecution of work for the Government, and by any person in the United States, either in private or public work, without payment to us of any royalty thereon.

Our invention relates particularly to certain types of breads which contain all the necessary ingredients of a complete diet.

The object of our invention is to provide a palatable and nutritious bread made by adding to wheat flour or other cereal flours, soy bean, peanut, or other similar types of flour, which contain the same amino acids necessary to supplement the protein deficiencies of wheat and other cereal flours; inorganic or organic salts containing calcium, phosphorus, sodium and chlorin, in which wheat and other cereal flours are also deficient; butter or other edible fats containing fat soluble vitamin. These ingredients when properly mixed and baked into bread in the ordinary manner known to housewives and bakers shall, together with water, constitute a complete food.

We have found by experimentation that soy bean, peanut, and other similar types of flours as herein described contain sufficient water-soluble vitamin to supplement the water-soluble vitamin in which ordinary wheat flours are deficient. Also that soy bean, peanut, and similar flours as herein described contain certain valuable proteins which are not found in wheat and other cereal flours, and that these proteins supplement the deficient proteins in wheat and other cereal flours.

We have also found by chemical and nutrition experiments that the proteins of soy bean, peanut and similar flours as herein described contain valuable amino acids in which wheat and other cereal flours are deficient, and that these amino acids supplement the deficient amino acids of wheat and other cereal flours. Mixtures of soy bean, peanut and other similar flours as herein described with wheat flours furnish a mixture of proteins containing all the essential amino acids in the proper proportions needed for producing normal growth without the addition of other amino acid or proteins. Breads made from mixtures of soy bean, peanut and other similar flours as herein described with wheat flours will contain a salt mixture adequate for normal growth when salts containing sodium, chlorin, calcium and phosphorus are added to the flours in small quantities.

The fat soluble vitamin needed for normal growth in breads made from mixtures of soy bean, peanut and other similar flours as herein described with wheat flours may be introduced by adding small quantities of butter to the dough before baking and the fat-soluble vitamin is not injured during the process of baking. We have also shown and discovered by experimentation that the fat-soluble vitamin needed for normal growth may be supplied by adding butter to the bread after it has been baked when no butter has been added to the dough.

The preferred proportions of the ingredients used in our experiments are as follows:

300 parts by weight of wheat flour.
100 parts by weight of soy bean or peanut flour.
6 parts by weight of table salt (NaCl).
6 parts by weight of dicalcium hydrogen phosphate ($CaHPO_4$).
20 parts by weight of butter.
10 parts by weight of compressed yeast.

These ingredients are then mixed with sufficient water to any desired consistency and the resulting dough is treated and baked into loaves or other shapes in the manner well known to house wives and bakers.

While we have described in detail, the preferred proportions of the ingredients used, it is to be understood that these proportions may be widely varied without departing from the spirit of our invention or the scope of the subjoined claims. For example, the quantities of the supplementing flour can be varied so that it can be used in the proportion of 15% to 30% with 85% to 70% of wheat or other cereal flours respectively. The quantity of butter or other edible fat containing fat soluble vitamin may be varied from 2% to 10% of the weight of the mixture of flours. The table salt (NaCl) and dicalcium hydrogen phosphate ($CaHPO_4$) may be varied so that $\frac{1}{2}$% to $1\frac{1}{2}$% of each are added to the mixture of flours. Other inorganic or organic salts containing calcium, phosphorus, sodium and chlorin, for example, calcium carbonate, calcium lactate, calcium chlorid, or sodium phosphate may be used in equivalent amounts to supply sodium, calcium, phosphorus and chlorin, in place of sodium chlorid (NaCl) and dicalcium hydrogen phosphate.

The yeast may also be varied in the manner well known to housewives and bakers.

Having now fully described our invention, what we claim and desire to protect by Letters Patent is—

1. The herein described process of producing food products, which consists in adding to cereal flour a smaller proportion of soy bean flour and still smaller proportions of table salt, dicalcium hydrogen phosphate, butter, water and yeast, kneading the mixture and baking the same.

2. A new food composition, comprising cereal flour, a smaller proportion of soy bean flour and still smaller proportions of table salt, dicalcium hydrogen phosphate, butter, water and yeast.

In testimony whereof, we affix our signatures in the presence of two subscribing witnesses.

CARL O. JOHNS.
ABRAHAM J. FINKS.

Witnesses:
H. C. WATERMAN,
SAMMIE PHILLIPS.